(12) United States Patent
Shim et al.

(10) Patent No.: US 7,586,825 B2
(45) Date of Patent: Sep. 8, 2009

(54) WAVE RETARDATION PLATE AND OPTICAL PICKUP DEVICE HAS THEM

(75) Inventors: Yong-Shig Shim, Seoul (KR);
Sung-Min Cho, Seongnam (KR);
Jae-Wan Jeong, Wonju (KR)

(73) Assignee: LGS Corporation Ltd., Gunpo, Kyeonggi-do (KR)

( * ) Notice: Subject to any disclaimer, the term of this patent is extended or adjusted under 35 U.S.C. 154(b) by 452 days.

(21) Appl. No.: 11/571,607

(22) PCT Filed: Nov. 16, 2004

(86) PCT No.: PCT/KR2004/002962

§ 371 (c)(1),
(2), (4) Date: Jan. 3, 2007

(87) PCT Pub. No.: WO2006/006755

PCT Pub. Date: Jan. 19, 2006

(65) Prior Publication Data

US 2008/0043328 A1 Feb. 21, 2008

(30) Foreign Application Priority Data

Jul. 8, 2004 (KR) ...................... 10-2004-0053062
Aug. 31, 2004 (KR) ...................... 10-2004-0069028

(51) Int. Cl.
*G11B 7/00* (2006.01)
(52) U.S. Cl. ............................. 369/112.01; 369/112.03; 369/44.11
(58) Field of Classification Search ........................ None
See application file for complete search history.

(56) References Cited

U.S. PATENT DOCUMENTS 6,917,576 B2 * 7/2005 Nishiyama et al. ...... 369/112.16

FOREIGN PATENT DOCUMENTS

| EP | 0810591 | 12/1997 |
| EP | 1126291 | 8/2001 |
| JP | 08-228053 | 9/1996 |
| JP | 2001-004841 | 1/2001 |

* cited by examiner

*Primary Examiner*—Muhammad N. Edun
(74) *Attorney, Agent, or Firm*—IPLA P.A.; Jamee E. Bame

(57) ABSTRACT

The present invention relates to a phase retardation plate including a thin organic film with a phase retardation function due to birefringence and a fixed substrate bonded to at least one surface of the thin organic film using an adhesive, and to an optical pickup device having the phase retardation plate. In the phase retardation plate and the optical pickup device using the same, a liner thermal expansion coefficient (L1) of the thin organic film, a liner thermal expansion coefficient (L2) of the adhesive and a liner thermal expansion coefficient (L3) of the fixed substrate satisfy a relationship of L1>L2>L3; and the thin organic film retards the phase of incident light with a wavelength in a range of 400 to 800 nm by $\pi/2$ or $\pi$, the thin organic film having a phase retardation value between 0 and $\pi$. Accordingly, there is provided a phase retardation plate and an optical pickup device using the same, wherein fixation between materials is securely kept against a change in temperature over a long period of time, thereby improving reliability of products and obtaining a desired amount of phase retardation for incident light of a wide wavelength band.

4 Claims, 6 Drawing Sheets

WAVE RETARDATION PLATE AND OPTICAL PICKUP DEVICE HAS THEM

TECHNICAL FIELD

The present invention relates to a phase retardation plate for use in an optical pickup device that reads data from an optical disc such as a compact disc (CD), a digital versatile disc (DVD), or the like.

BACKGROUND ART

Figure 1:
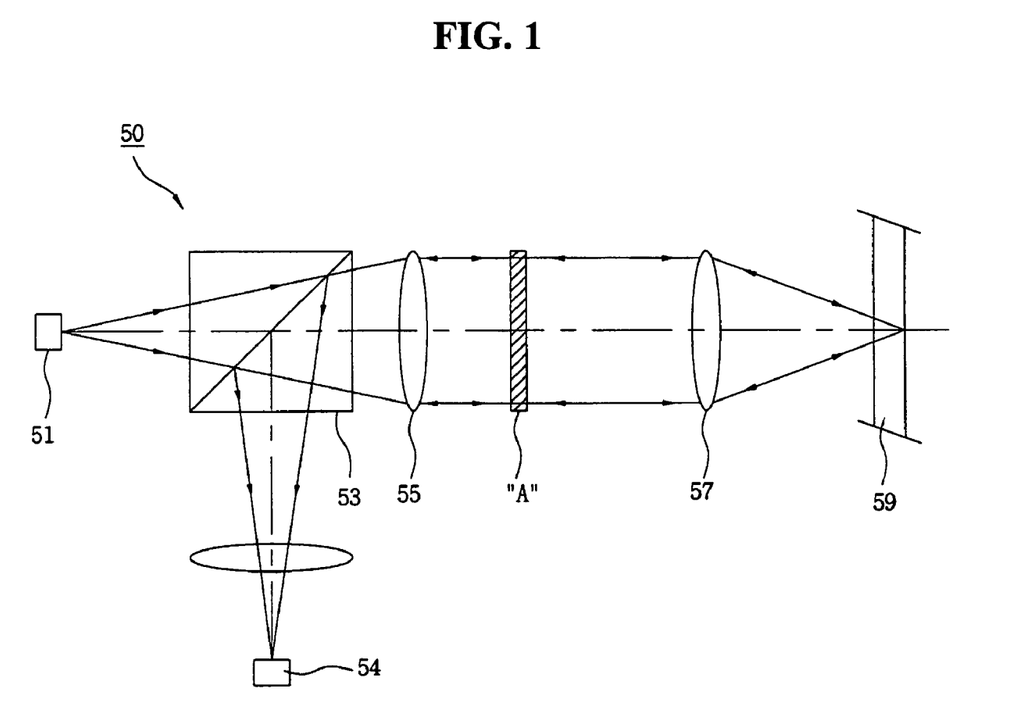
FIG. 1 is a view showing a configuration of a typical optical pickup device.

An optical pickup device 50 reads data stored in an optical disc 59 by focusing and inducing a beam from a light source 51 onto the optical disc 59 via a beam splitter 53, a collimating lens 55, and an objective lens 57 and by receiving a reflected light from the optical disc 59 using an optical detector 54, as shown in FIG. 1.

At this time, a linearly polarized light beam is generated from the light source 51 and is then directed to the optical disc 59. The linearly polarized light beam should be converted into a circularly polarized light beam (or an elliptically polarized light beam), and be then irradiated to the optical disc 59. The circularly polarized light beam (or the elliptically polarized light beam) reflected by the optical disc 59 should be converted back to the linearly polarized light beam and then delivered to the optical detector 54 so that data are read.

A phase retardation plate A is disposed to perform the conversion between the polarization states of the beam. The phase retardation plate performs the conversion between the polarization states of the beam by retarding the phase of the transmitted beam on a beam path between the light source 51 and the optical disc 59.

To perform the conversion between the polarization states of the beam, the conventional phase retardation plate A adjusts the amount of phase retardation of the transmitted beam by properly machining the thickness of an inorganic single crystal, such as quartz.

However, with the phase retardation plate A using such an inorganic single crystal, it is very difficult to obtain a desired amount of phase retardation since a phase difference of the transmitted beam significantly depends on an incidence angle. Further, the dependency of the phase difference of the transmitted beam on the incidence angle requires to dispose the phase retardation plate A in a parallel light forming region, resulting in increase in the area of the phase retardation plate A.

Further, it is required to finely adjust the thickness of the single crystal so as to obtain a desired amount of phase retardation. The adjustment of the thickness involves a complicated manufacturing process such as an optical polishing process for the single crystal. Accordingly, there is a problem in that the phase retardation plate is difficult to manufacture and is expensive.

Further, the phase retardation plate A using the conventional inorganic single crystal cannot cope with fluctuation of an oscillation wavelength in the beam due to increase in temperature as the optical pickup device is run over a long period of time. Accordingly, there is a problem in that a desired amount of beam phase retardation is not obtained.

A phase retardation plate for solving such problems is disclosed in Korean Patent Laid-Open Publication No. 2001-0089321. This phase retardation plate has a structure in which a thin organic film with birefringence is bonded, with an adhesive, to a surface of a fixed substrate having the function of transmitting or reflecting light, and a liner thermal expansion coefficient ($E_1$) of the thin organic film, a liner thermal expansion coefficient ($E_2$) of the adhesive and a liner thermal expansion coefficient ($E_3$) of the fixed substrate satisfy the relationships of $E_1 < E_2$ and $E_3 < E_2$.

This phase retardation plate uses the thin organic film having a birefringence property for the phase retardation of the beam so that a desired amount of phase retardation is easily obtained without needing a separate machining process. Further, miniaturization is realized because the phase retardation plate has less dependency of the phase difference on the incidence angle. Thus, the phase retardation plate is easily manufactured and production costs thereof are reduced.

Further, since the phase retardation value of the thin organic film can cope with a change in temperature, a desired amount of phase retardation can be obtained even though the oscillation wavelength of the beam is fluctuated due to increase in temperature as the optical pickup device is run over a long period of time.

Although expansion deformation of the thin organic film may be caused by the increase in temperature, the expansion of the thin organic film and the fixed substrate is absorbed by the adhesive since the liner thermal expansion coefficients among the thin organic film, the adhesive and the fixed substrate satisfy the relationships of $E_1 < E_2$ and $E_3 < E_2$, thereby preventing the deformation due to the increase in temperature.

However, in such a conventional phase retardation plate using the thin organic film, the liner thermal expansion coefficient ($E_2$) of the adhesive is greater than the liner thermal expansion coefficient ($E_1$) of the thin organic film and the liner thermal expansion coefficient ($E_3$) of the fixed substrate. Accordingly, there is a problem in that the adhesive is significantly changed in length due to the increase in temperature, thereby deteriorating the adhesion reliability of the adhesive.

For example, as disclosed in the aforementioned Patent Laid-Open Publication, the coefficient difference between the adhesive and the fixed substrate becomes about 110 if an adhesive with a liner thermal expansion coefficient ($E_2$) of $1.2 \times 10^{-4}/°$ C. is used, polycarbonate with a liner thermal expansion coefficient ($E_1$) of $6.2 \times 10^{-6}/°$ C. is used as the thin organic film, and a glass substrate with a liner thermal expansion coefficient ($E_3$) of $95 \times 10^{-7}/°$ C. is used as the fixed substrate such that the liner thermal expansion coefficients of the thin organic film, the adhesive and the fixed substrate satisfy the relationships of $E_1 < E_2$ and $E_3 < E_2$.

Then, a change in relative length between the adhesive and the fixed substrate due to the change in temperature is found to be about 110 μm when temperature is changed by 1° C. This large length difference degrades an adhesion force, which is dependent on the change in the adhesive length due to frequent changes in temperature. Further, it degrades fixation of the adhesive after the long period of time, thereby causing a peeling phenomenon.

Meanwhile, the conventional phase retardation plate using the thin organic film adjusts polarization states of incident light using a predetermined phase retardation value according to a wavelength band of the incident light. Accordingly, as for a wide wavelength band of incident light, a plurality of phase retardation plates are required to retard the phase of the incident light in a desired wavelength band.

DISCLOSURE OF INVENTION

Technical Problem

Accordingly, an object of the present invention is to provide a phase retardation plate and an optical pickup device using the same, wherein fixation between materials is securely kept against a change in temperature over a long period of time, thereby improving reliability of products and obtaining a desired amount of phase retardation for incident light of a wide wavelength band.

TECHNICAL SOLUTION

The object of the present invention is achieved by a phase retardation plate including a thin organic film with a phase retardation function due to birefringence and a fixed substrate bonded to at least one surface of the thin organic film using an adhesive, according to an aspect of the present invention. In the phase retardation plate, a liner thermal expansion coefficient ($L_1$) of the thin organic film, a liner thermal expansion coefficient ($L_2$) of the adhesive and a liner thermal expansion coefficient ($L_3$) of the fixed substrate satisfy a relationship of $L_1 > L_2 > L_3$; and the thin organic film retards the phase of incident light with a wavelength in a range of 400 to 800 nm by $\pi/2$ or $\pi$, the thin organic film having a phase retardation value between 0 and $\pi$.

Preferably, fixed substrates are bonded to both surfaces of the thin organic film.

Diffraction lattices may be advantageously formed on at least one surface of the fixed substrate.

The object of the present invention is achieved by an optical pickup device including a light source, an objective lens for focusing and inducing a beam from the light source to an optical recording medium, an optical detector for receiving a reflected beam from the optical recording medium via the objective lens, and a phase retardation plate disposed on a beam path from the light source to the objective lens and the optical detector, according to another aspect of the present invention. In the optical pickup device, the phase retardation plate is the phase retardation plate according to claim 1, claim 2 or claim 3.

ADVANTAGEOUS EFFECTS

According to the present invention, there are provided a phase retardation plate and an optical pickup device using the same, wherein fixation between materials is securely kept against a change in temperature over a long period of time, thereby improving reliability of products and obtaining a desired amount of phase retardation for incident light of a wide wavelength band.

EXPLANATION OF REFERENCE NUMERALS FOR DESIGNATING MAIN COMPONENTS IN THE DRAWINGS

| | |
|---|---|
| 1: Phase retardation plate | 10: Thin organic film |
| 20: Adhesive | 30: Fixed substrate |
| 40: Diffraction lattices | 50: Optical pickup device |

BEST MODE FOR CARRYING OUT THE INVENTION

Hereinafter, the present invention will be described in detail with reference to the accompanying drawings.

Figure 2:
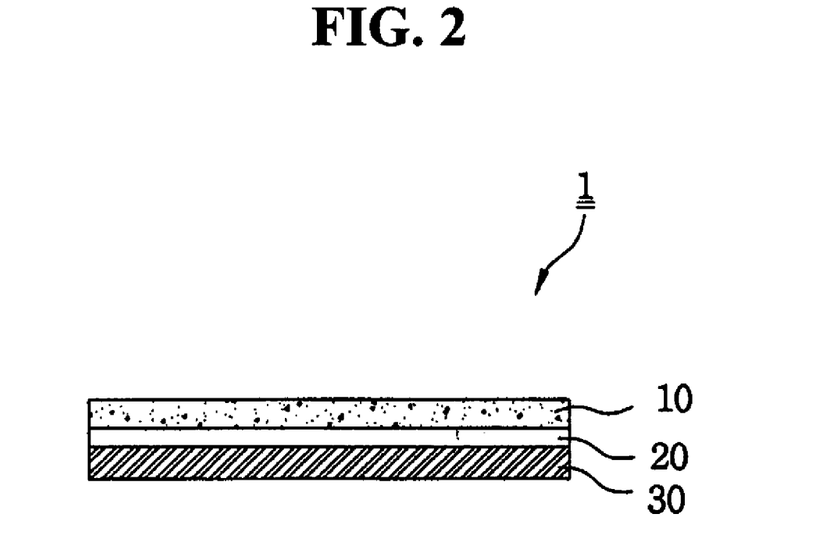
FIG. 2 is a sectional view of a phase retardation plate according to a first embodiment of the present invention.

FIG. 2 is a sectional view of a phase retardation plate according to a first embodiment of the present invention. As shown in FIG. 2, a phase retardation plate 1 of the present invention has a thin organic film 10 with birefringence, an adhesive 20 coated on at least a surface of the thin organic film 10, and a fixed substrate 30 bonded to the thin organic film 10 by means of the adhesive 20 to maintain the shape of the thin organic film 10. A liner thermal expansion coefficient ($L_1$) of the thin organic film 10, a liner thermal expansion coefficient ($L_2$) of the adhesive 20, and a liner thermal expansion coefficient ($L_3$) of the fixed substrate 30 satisfy a relationship of $L_1 > L_2 > L_3$.

The thin organic film 10 may be formed to have a phase difference generating function by imparting birefringence to any one of polycarbonate, polyimide, polyarylate, polyethersulfone, (alicyclic) polyolefin, poly(metha)crylate and polyetherimide, or a polymer thereof, which satisfies the aforementioned relationship of $L_1 > L_2 > L_3$.

Preferably, the polycarbonate is selected as a mass production material because of its superior industrial stability in view of mass production. Further, a material with a glass transition temperature of 110° C. or more is used as a material for the thin organic film 10 to prevent the phase difference generating function from being degraded due to a rise in temperature.

Further, the thin organic film 10 has such a phase retardation value that incident light with a wavelength band of 400 to 800 nm is retarded in phase by $\pi/2$ or $\pi$. Alternatively, the thin organic film may have any phase retardation value between 0 and $\pi$.

According to a wavelength band, such a phase retardation value can allow retardation of the incident light in phase by 90° to convert the incident light from a linearly polarized light to a circularly polarized light beam, or retardation of the incident light in phase by 180° to convert the incident light from the linearly polarized light to a linearly polarized light that is rotated by 90°. Further, any desired phase retardation value between 0 and $\pi$ can allow a single phase retardation plate rather than a plurality of phase retardation plates to convert the polarized state of the incident light into a proper polarized state according to a certain wavelength band belonging to a relatively wide wavelength band As for the adhesive 20, any one of acryl, epoxy, urethane, polyester, polyimide, urea, melamine, furan resin, isocyanate, silicone, cellulose, acetic acid vinyl, vinyl chloride and rubber, or a mixture thereof can be used, all of which satisfy the aforementioned relationship of $L_1 > L_2 > L_3$ and an UV curable or thermal curable property.

Preferably, the adhesive 20 is smoothly coated up to a constant thickness on the surface of the thin organic film 10 to reduce wavefront aberration. The coating can be easily performed and a coating thickness can be easily adjusted by using spin coat, roll coat or the like as a method of coating the adhesive 20.

Preferably, the adhesive 20 is formed of a material with the substantially same refraction index as the thin organic film 10. This is to reduce scattering of the transmitted light and reflection loss at an interface between the adhesive 20 and the thin organic film 10.

It is preferred that the fixed substrate 30 be a smooth glass substrate that satisfies the aforementioned relationship of $L_1 > L_2 > L_3$ and has light transmitting and/or reflecting capability. At this time, the reflecting capability is imparted to the fixed substrate 30 by means of a reflecting surface formed on the surface of the glass substrate using a thin film of aluminum or another metal.

For example, the phase retardation plate 1 with such a structure includes a phase retardation plate 1 that comprises a thin organic film 10 formed of polycarbonate with a liner thermal expansion coefficient ($L_1$) of $120 \times 10^{-6}/°$ C., an adhesive 20 formed of an acryl-based resin with a liner thermal expansion coefficient ($L_2$) of $63 \times 10^{-6}/°$ C., and a fixed substrate 30 formed of a glass substrate with a liner thermal expansion coefficient ($L_3$) of $7.2 \times 10^{-6}/°$ C.

In this phase retardation plate 1, the liner thermal expansion coefficients of the thin organic film 10, the adhesive 20 and the fixed substrate 30 are required to satisfy the relationship of $L_1 > L_2 > L_3$ and to have a difference therebetween in the range of about 50 to 70 µm. By doing so, a difference in the coefficients between the thin organic film 10 and the fixed substrate 30, which is caused by increase in temperature, is absorbed by the adhesive 20 with an intermediate value of the difference, thereby preventing the thin organic film 10 from being deformed.

In particular, a significant change of the adhesive 20 in length due to the increase in temperature does not occur since its liner thermal expansion coefficient is small. Accordingly, a fixing force of the adhesive 20 is maintained even though temperature is frequently changed over a long period of time, so that a peeling phenomenon does not occur and fixation between the thin organic film 10 and the fixed substrate 30 can be securely maintained over a long period of time.

Further, the thin organic film 10 can retard the phase of the incident light with a wavelength in a range of 400 to 800 nm by $\pi/2$ or $\pi$. Further, since the thin organic film has a phase retardation value between 0 to $\pi$, the thin organic film 10 can convert the incident light into polarized light at a proper angle according to a certain wavelength band belonging to a relatively wide wavelength band using a single phase retardation plate rather than a plurality of phase retardation plates.

Figure 3:
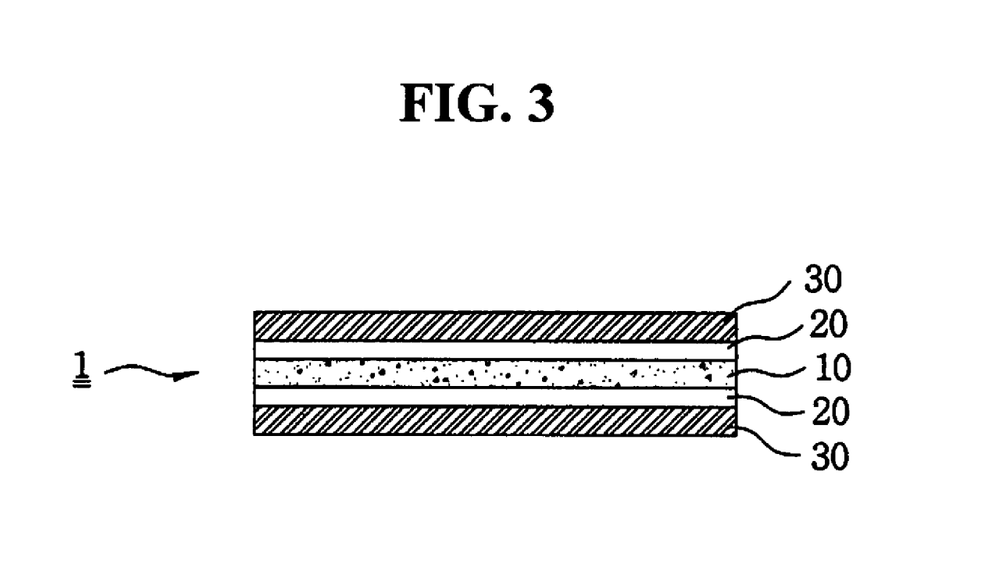
FIG. 3 is a sectional view of a phase retardation plate according to a second embodiment of the present invention.

Meanwhile, FIG. 3 is a sectional view of a phase retardation plate according to a second embodiment of the present invention. According to this embodiment, the phase retardation plate 1 has a structure in which substrates 30 are fixed to both surfaces of a thin organic film 10 in a state where liner thermal expansion coefficients of the thin organic film 10, adhesives 20 and the fixed substrates 30 of the phase retardation plate 1 satisfy the relationship of $L_1 > L_2 > L_3$.

The structure of the phase retardation plate 1 according to this embodiment is a structure capable of more effectively compensating fluctuation in a phase difference when an oscillation wavelength of the transmitted beam is fluctuated due to a change in temperature as compared to the phase retardation plate 1 of the aforementioned first embodiment.

Figure 4:
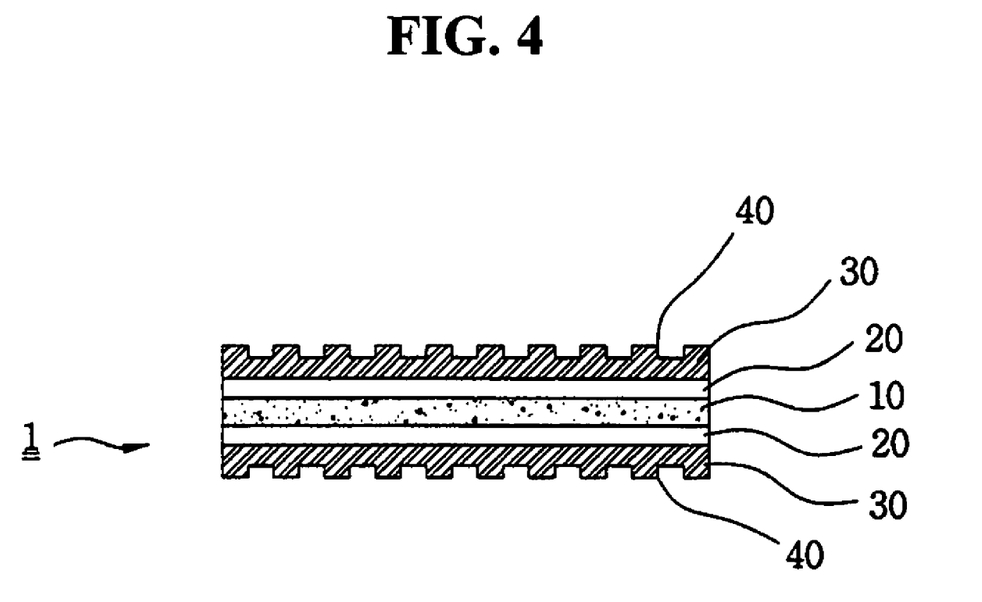
FIG. 4 is a sectional view of a phase retardation plate according to a third embodiment of the present invention.

FIG. 4 is a sectional view of a phase retardation plate according to a third embodiment of the present invention. According this embodiment, the phase retardation plate 1 has the substantially same structure as the phase retardation plate 1 of the aforementioned second embodiment. Diffraction lattices 40 are formed on one surface of each of two fixed substrates 30 in a state where the liner thermal expansion coefficients of the thin organic film 10, the adhesive 20 and the fixed substrate 30 satisfy the relationship of $L_1 > L_2 > L_3$.

According to this embodiment, the phase retardation plate 1 is implemented to have both functions of retarding the phase of the transmitted beam to perform conversion between the polarization states thereof, and splitting the transmitted beam into a main beam and a sub-beam so that the main beam functions to read information from an optical disc 59' and the sub-beam functions to recognize the position of a track and deliver it to an optical detector 54'.

At this time, it will be apparent that this structure with the diffraction lattices 40 formed on the fixed substrates 30 may be applied to the fixed substrate 30 of the aforementioned first embodiment.

Figure 5:
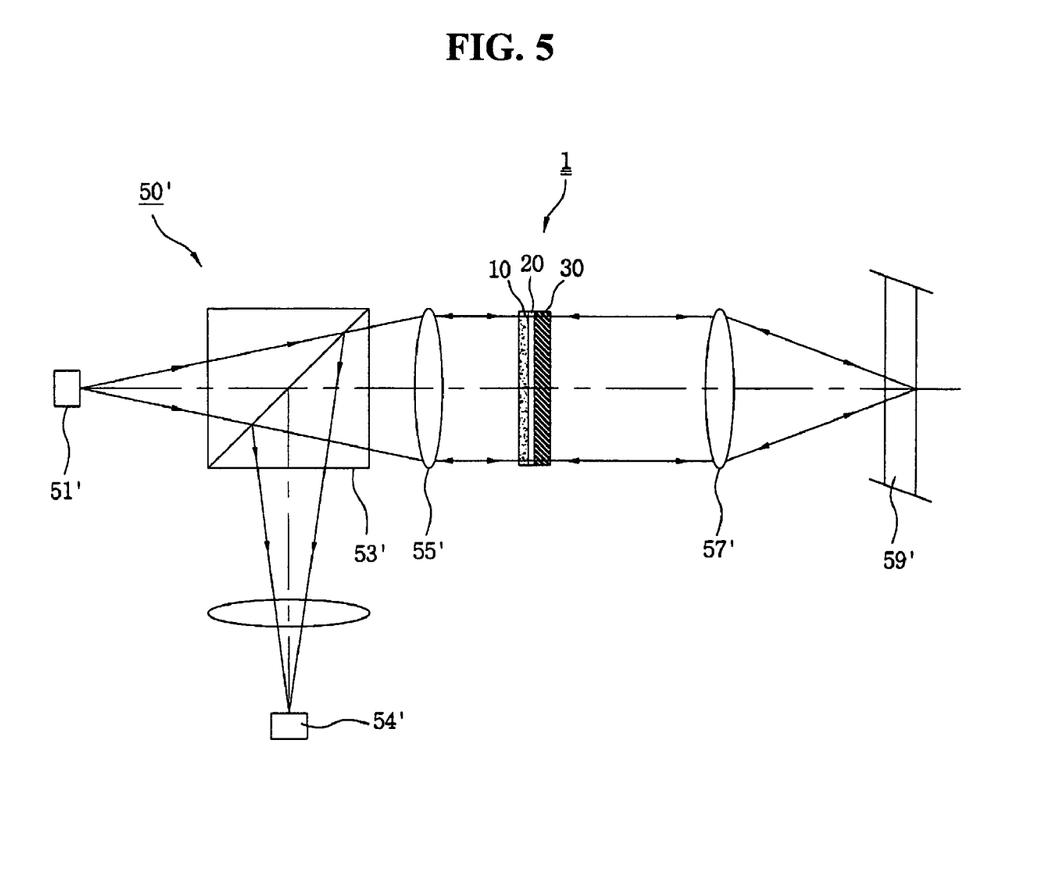
FIGS. 5 to 7 are views showing configurations of optical pickup devices having the phase retardation plates of FIGS. 2 to 4, respectively.
Figure 6:
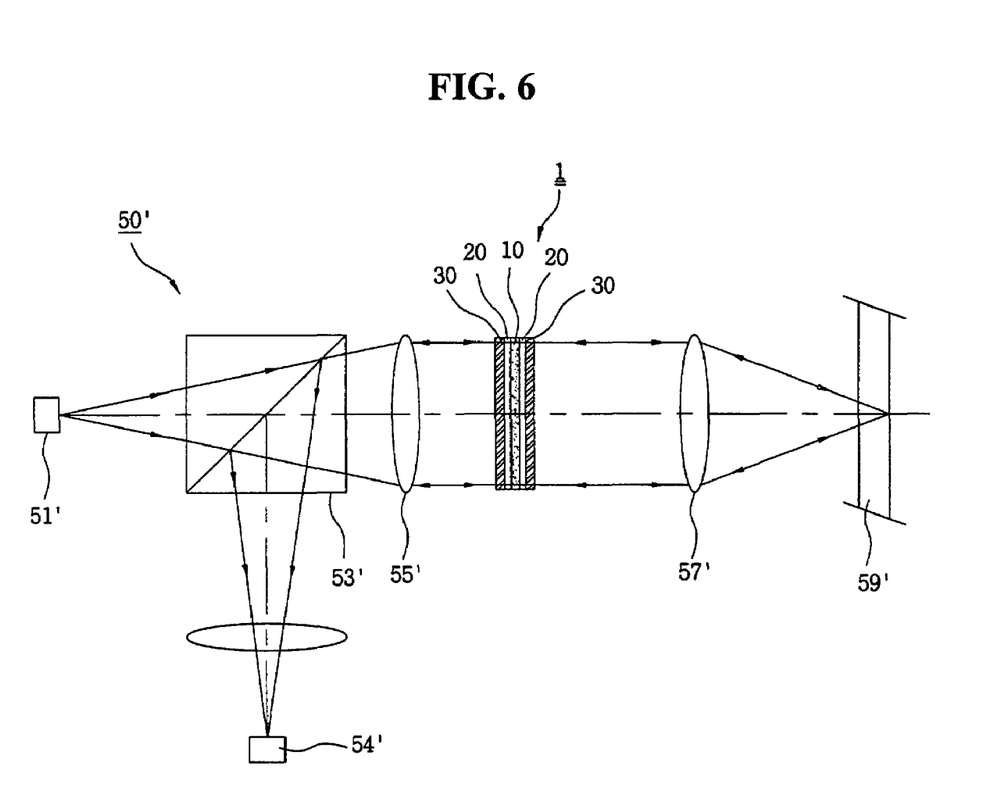
Figure 7:
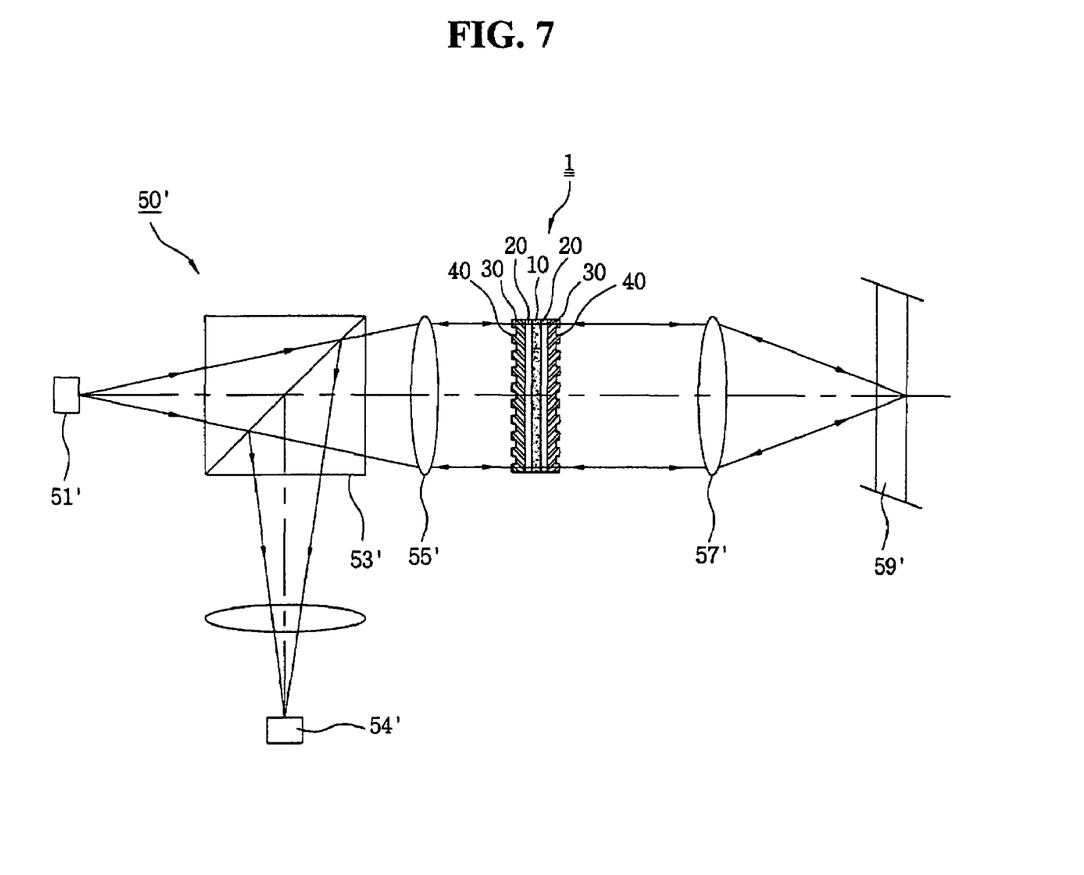

The phase retardation plate 1 of each of the aforementioned embodiments is disposed on a beam path of an optical pickup device 50' for performing conversion between the polarization states of the transmitted beam while coping with a change in temperature, as shown in FIGS. 5 to 7.

As described above, by providing the phase retardation plate in which the liner thermal expansion coefficient ($L_1$) of the thin organic film, the liner thermal expansion coefficient ($L_2$) of the adhesive, and the liner thermal expansion coefficient ($L_3$) of the fixed substrate satisfy the relationship of $L_1 > L_2 > L_3$, a difference in the coefficients between the thin organic film and the fixed substrate, which is caused by increase in temperature, is absorbed by the adhesive with an intermediate value of the difference, thereby preventing the thin organic film from being deformed. Further, a significant change of the adhesive 20 in length due to increase in temperature does not occur since its liner thermal expansion coefficient is small.

Further, since a fixing force of the adhesive is maintained even though temperature is frequently changed over a long period of time, a peeling phenomenon does not occur. Further, fixation between the thin organic film and the fixed substrate is securely maintained over a long period of time, thereby dramatically improving product reliability of the phase retardation plate and the optical pickup device having the phase retardation plate.

Further, the thin organic film has such a phase retardation value that it retards the phase of incident light with a wavelength in a range of 400 to 800 nm by $\pi/2$ or $\pi$, and the phase retardation value is between 0 to $\pi$. Accordingly, it is possible to convert incident light with a wavelength belonging to a wide wavelength band into a proper polarized state using a single phase retardation plate.

INDUSTRIAL APPLICABILITY

As described above, according to the present invention, there is provided a phase retardation plate and an optical pickup device using the same, wherein fixation between materials is securely kept against a change in temperature over a long period of time, thereby improving reliability of products and obtaining a desired amount of phase retardation for incident light of a wide wavelength band.

The invention claimed is:

1. A phase retardation plate including a thin organic film with a phase retardation function due to birefringence and a fixed substrate bonded to at least one surface of the thin organic film using an adhesive, wherein:

a liner thermal expansion coefficient ($L_1$) of the thin organic film, a liner thermal expansion coefficient ($L_2$) of the adhesive and a liner thermal expansion coefficient ($L_3$) of the fixed substrate satisfy a relationship of $L_1 > L_2 > L_3$, and the thin organic film retards the phase of incident light with a wavelength in a range of 400 to 800 nm by $\pi/2$ or $\pi$, the thin organic film having a phase retardation value between 0 and $\pi$.

2. The plate as claimed in claim 1, wherein fixed substrates are bonded to both surfaces of the thin organic film.

3. The plate as claimed in claim 1, wherein diffraction lattices are formed on at least one surface of the fixed substrate.

4. An optical pickup device including a light source, an objective lens for focusing and inducing a beam from the light source to an optical recording medium, an optical detector for receiving a reflected beam from the optical recording medium via the objective lens, and a phase retardation plate disposed on a beam path from the light source to the objective lens and the optical detector, wherein:

the phase retardation plate is the phase retardation plate according to claim 1, claim 2 or claim 3.

* * * * *